United States Patent [19]

van Doorn

[11] 4,225,834
[45] Sep. 30, 1980

[54] EQUALIZING NETWORK HAVING A PLURALITY OF FREQUENCY SENSITIVE ATTENUATION BRANCHES IN A NEGATIVE FEEDBACK ARRANGEMENT

[75] Inventor: Willem van Doorn, Hilversum, Netherlands

[73] Assignee: U.S. Philips Corporation, New York, N.Y.

[21] Appl. No.: 45,491

[22] Filed: Jun. 4, 1979

[30] Foreign Application Priority Data

Jun. 22, 1978 [NL] Netherlands .................. 7806727

[51] Int. Cl.$^2$ .......................... H04B 3/14; H03H 7/14
[52] U.S. Cl. .................................. 333/28 R; 330/109
[58] Field of Search ............ 330/109, 294; 333/28 R, 333/28 T, 18

[56] References Cited

U.S. PATENT DOCUMENTS

| 2,658,958 | 11/1953 | Wells | 333/28 T X |
| 3,336,539 | 8/1967 | Kwartiroff et al. | 333/28 R X |

Primary Examiner—Paul L. Gensler
Attorney, Agent, or Firm—T. A. Briody; Bernard Franzblau

[57] ABSTRACT

An equalizing network for attenuation/frequency characteristic equalization. The equalizing network comprises a plurality of attenuation branches $B_1$ to $B_8$ which are operative in mutually different frequency sub-bands covering a wide frequency band. A negative feedback amplifier 10 has its negative feedback factor set for each frequency sub-band by means of a potentiometer $P_1$ to $P_8$ which is part of the relevant attenuation branch. Resistors 17, 18, 19 and 20 form the negative feedback circuit for the amplifier 10 and provide voltage-dividing, to alter the feedback factor and thus the gain of the amplifier 10, for the individual frequency sub-bands as determined by the potentiometer settings. Attenuation branches pertaining to non-adjacent frequency sub-bands are grouped together in two groups X and Y to obviate the need for separation amplifiers for each attenuation branch.

2 Claims, 1 Drawing Figure

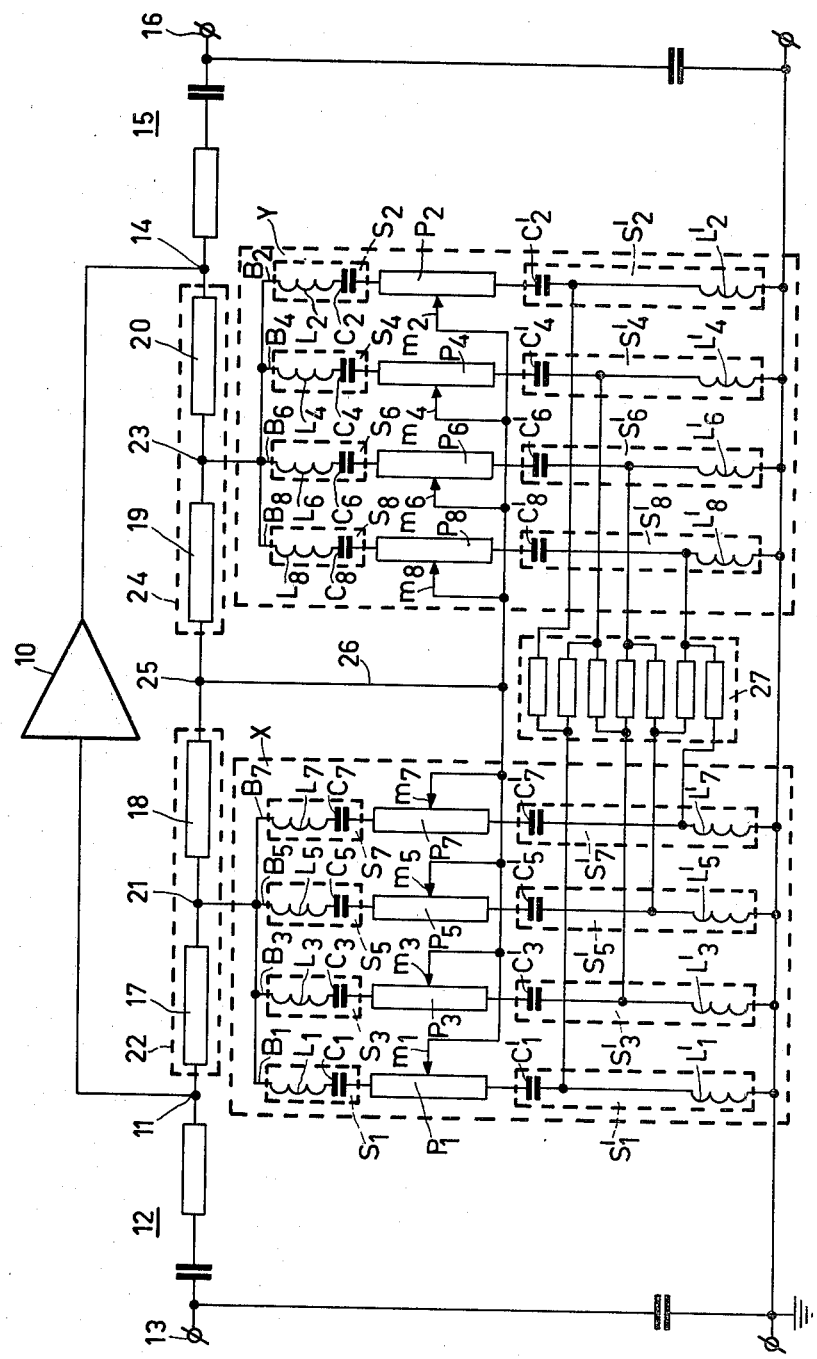

EQUALIZING NETWORK HAVING A PLURALITY OF FREQUENCY SENSITIVE ATTENUATION BRANCHES IN A NEGATIVE FEEDBACK ARRANGEMENT

The present invention relates to an equalizing network which is suitable for attenuation/frequency characteristic equalization, particularly but not exclusively in respect of the transmission of signals over a coaxial cable, and which is of a type comprising a plurality of adjustable attenuation branches adapted to operate in mutually different frequency sub-bands.

When an equalizing network of the above type is used in systems in which carrier-telephony signals or television signals are transmitted over a coaxial cable, the network must be suitable for the equalization of residual errors in a wide frequency band. To be able to satisfy this requirement it is known to implement each of the attenuation branches of the equalizing network as an adjustable Bode network. At an intermediate frequency in the relevent sub-band each Bode network is adjusted to the required attenuation value in order to level the attenuation/frequency characteristic in that sub-band. However, Bode networks comprise a relatively large number of components. In addition, the individual Bode networks must be separated from one another by means of amplifiers in order to prevent the respective Bode network impedances from affecting one another. These amplifiers are also necessary in order to reduce the overall attenuation of the equalizing network. Consequently, an equalizing network implemented by means of Bode networks has a complicated structure.

It is an object of the invention to provide an equalizing network of the type defined above which is suitable for attenuation/frequency characteristic equalization in a wide frequency band, which has a comparatively low overall attenuation and which is of a simple implementation.

According to the invention an equalizing network of the type defined above is characterized in that each of its attenuation branches is formed by the series arrangement of, in the following order, a first series resonant circuit, a potentiometer having a movable contact, and a second series resonant circuit, the first and second series resonant circuits each being tuned to the same intermediate frequency located in the relevant frequency sub-band. Furthermore, the attenuation branches are arranged in a first and a second group such that attenuation branches pertaining to adjacent frequency sub-bands are in different groups and the attenuation branches in the same group are arranged in parallel and connected to ground at one end. The equalizing network further comprises an amplifier the input of which is connected through a matching impedance to an input terminal of the network and the output of which is connected through a matching impedance to an output of the network, and also to the amplifier input through a negative feedback circuit. In addition said negative feedback circuit is formed by the series-arranged resistors and the common junction of the resistors forming the first pair and the common junction of the resistors forming the second pair are connected to the ends, remote from ground, of the first group and the second group of parallel-arranged attenuation branches, respectively. And finally in that the common junction of the first pair and the second pair of resistors is connected to all the movable potentiometer contacts of the two groups of attenuation branches.

The invention and its advantages will be further explained with reference to an embodiment of the equalizing network according to the invention shown, by way of example, in the single FIGURE of the accompanying drawing.

The equalizing network shown in the drawing is adapted to equalize a wide frequency band and is provided, for this purpose, with eight attenuation branches $B_1, B_2, \ldots B_8$, which operate in mutually different frequency sub-bands covering the wide frequency band. These attenuation branches are all of the same construction. To distinguish between the elements associated with the different attenuation branches, the reference characters in the FIGURE associated with these elements have been given an index which refers to the relevant attenuation branch. The attenuation branch $B_1$ is formed by the series arrangement of, in the following order, a first series resonant circuit $S_1$, a potentiometer $P_1$ having a movable contact $m_1$, and a second series resonant circuit $S'_1$. The second attenuation branch $B_2$ is likewise formed by the series arrangement of, in the following order, a first series resonant circuit $S_2$, a potentiometer $P_2$ having a movable contact $m_2$, and a second series resonant circuit $S'_2$. The other attenuation branches $B_3$ to $B_8$ are similarly formed, as shown. Each of the series resonant circuits $S_1$ to $S_8$ inclusive comprises the series arrangement of a coil $L_1, L_2 \ldots L_8$, respectively, and a capacitor $C_1, C_2 \ldots C_8$, respectively. Each of the series resonant circuits $S'_1$ to $S'_8$ comprises the series arrangement of a coil $L'_1, L'_2 \ldots L'_8$ respectively, and a capacitor $C'_1, C'_2, \ldots C'_8$, respectively.

The first and the second series resonant circuits of each attenuation branch are tuned to the same intermediate frequency located in the relevant frequency sub-band. This intermediate frequency determines the frequency sub-band for which the relevant attenuation branch is active. The eight attenuation branches $B_1, B_2 \ldots B_8$ are active in mutually different sequential frequency sub-bands covering the wide frequency band. This total number (eight) of attenuation branches is subdivided into two groups X and Y, respectively. Each group comprises four attenuation branches such that attenuation branches which are active in adjacent frequency sub-bands are in different groups. Thus, the first group X comprises the attenuation branches $B_1, B_3, B_5$ and $B_7$, whereas the second group Y comprises the attenuation branches $B_2, B_4, B_6$ and $B_8$. As shown in the Figure, the attenuation branches in the same group are arranged in parallel and are connected to ground at one end.

The equalizing network further comprises an amplifier 10 having an input 11 which is connected to an input terminal 13 of the network through a matching impedance 12, and an output 14 which is connected through a matching impedance 15 to an output terminal 16 of the network. Output 14 is also connected to the amplifier input 10 through a negative feedback circuit formed by the series arrangement of four resistors 17, 18, 19 and 20. The two resistors 17 and 18 are interconnected at a point 21 and together form a first pair 22, while the two resistors 19 and 20 are interconnected at a point 23 and together form a second pair 24. These resistor pairs 22 and 24 are interconnected at a point 25.

The common junction (formed by the point 21) of the resistors 17 and 18 which form the first resistor pair 22, and the common junction (formed by the point 23) of the resistors 19 and 20 which form the second resistor pair 24, are connected to the ends, remote from ground, of the first group X and the second group Y of parallel-arranged attenuation branches $B_1$, $B_3$, $B_5$, $B_7$ and $B_2$, $B_4$, $B_6$, $B_8$, respectively. The common junction (formed by the point 25) of the said first and second resistor pairs 22 and 24 is connected to all the movable contacts $m_1$ to $m_8$ inclusive, of the potentiometers $P_1$ to $P_8$, inclusive, of the two groups of attenuation branches.

The input (matching) impedance 12 and the output (matching) impedance 15 are both equal to line impedance (say 75 ohm) and are not influenced in any respect by the position of the movable contacts $m_1$ to $m_8$ of the potentiometers $P_1$ to $P_8$.

In addition, the amplifier 10, with its negative feedback, is rated so that the gain over the entire wide frequency band is equal to unity when the movable contacts of all the potentiometers $P_1$ to $P_8$ are in the central position. This gain can be made smaller or greater than unity for each frequency sub-band by appropriate adjustment of the movable contact of the potentiometer of the relevant attenuation branch from its central position. The negative feedback circuit arranged between the output 14 and the input 11 of the amplifier 10 constitutes a voltage divider circuit consisting of the series arrangement of the resistors 17, 18, 19 and 20. The attenuation branches $B_1$, $B_3$, $B_5$ and $B_7$ of the first group X are arranged in parallel between ground and the point 21 at which the resistors 17 and 18 are interconnected, while the attenuation branches $B_2$, $B_4$, $B_6$ and $B_8$ of the second group Y are connected in parallel between ground and the point 23 at which the resistors 19 and 20 are interconnected. In addition, all the movable contacts $m_1$, $m_3$, $m_5$ and $m_7$ of the potentiometers $P_1$, $P_3$, $P_5$ and $P_7$ belonging, respectively, to the attenuation branches of the first group X, and all the movable contacts $m_2$, $m_4$, $m_6$ and $m_8$ of the potentiometers $P_2$, $P_4$, $P_6$ and $P_8$ belonging, respectively, to the attenuation branches of the second group Y, are interconnected and connected through a common lead 26 to the point 25 at which the resistors 18 and 19 are interconnected. By virtue of these connections the resistor 18, which is part of the negative feedback circuit, is shunted frequency-selective, that is, it is shunted per frequency sub-band, by the preset resistance value of the potentiometers $P_1$ and $P_3$, $P_5$ and $P_7$, respectively, of the attenuation branches $B_1$ and $B_3$, $B_5$ and $B_7$, respectively, which are active in the relevant frequency sub-band. Similarly, the resistor 19, which is also part of the negative feedback circuit, is shunted frequency-selective, that is, it is also shunted per frequency sub-band, by the preset resistance value of the potentiometers $P_2$ and $P_4$, $P_6$ and $P_8$, respectively, of the attenuation branches $B_2$ and $B_4$, $B_6$ and $B_8$, respectively, which are active in the relevant frequency sub-band. Thus, the negative feedback factor of the amplifier 10 is adjustable for each frequency sub-band in dependence on the resistance values of the potentiometers which are arranged in parallel with the resistors 18 and 19, respectively. If it is, for example, assumed that the attenuation branch $B_1$ of group X operates in the frequency sub-band whose intermediate frequency is equal to $f_{01}$, then the first and the second series resonant circuits $S_1$ and $S'_1$ are both tuned to the frequency $f_{01}$. When the movable contact $m_1$ of potentiometer $P_1$ is in the centre position, the relevant frequency sub-band is not influenced since the bridge formed by the resistors 18 and 19 and the two halves of the potentiometer $P_1$ are in equilibrium and the amplifier gain remains, consequently, equal to unity. If, however, the movable contact $m_1$ of the potentiometer $P_1$ is in its highest position (as viewed in the FIGURE) in which the potentiometer resistance equals 0 ohm, then the resistor 18 which is part of the negative feedback circuit is short-circuited for the frequency $f_{01}$ by the series resonant circuit $S_1$ tuned to this frequency. The negative feedback factor then becomes greater and the amplifier gain falls to below unity. When, conversely, the movable contact $m_1$ of the potentiometer $P_1$ is in its lowest position (as viewed in the FIGURE) in which the potentiometer resistance is a maximum, then this resistance is connected in parallel with the resistor 18 through the series resonant circuit $S_1$ and the common lead 26. The negative feedback factor then becomes smaller and the amplifier gain becomes greater than unity. The operation of the other attenuation branches can be explained in exactly the same manner. For the attenuation branches of the group Y, the resistor 19 replaces the resistor 18 in the operation. It is, of course, necessary to decouple the attenuation branches which operate in adjacent frequency sub-bands in order to prevent intermediate parallel resonances from being produced. For the described equalizing network that is accomplished in a particularly simple and effective manner because the attenuation branches which are active in adjacent frequency sub-bands belong to the different groups X and Y, respectively; so that the first series resonant circuits of the attenuation branches which are active in adjacent frequency sub-bands are automatically decoupled by the resistors 18 and 19, which are part of the negative feedback circuit. As regards decoupling of the second series resonant circuits of the attenuation branches which are active in adjacent frequency sub-bands, the network is provided with decoupling resistors 27 which are arranged in the manner shown in the FIGURE between the respective second series resonant circuits.

In a practical embodiment of the described equalizing network, suitable for use in a 60 MHz carrier system, a control range of $+$ and $-4$ dB was realized and a noise factor $F = 10.5$ dB was measured, with each potentiometer in its central position.

In addition, it appears that the setting procedure to obtain a sufficiently accurate approximation of the desired level correction takes slightly more time compared with the known, more complicated, equalizing networks. However, this is no real drawback as the equalizing network requires adjustment only once, namely when the carrier system is being installed. Of greater importance is the saving in amplifiers and network components, whereby the reliability is increased to a considerable extent. Furthermore, all attenuation branches in an equalizing network according to the invention are part of one and the same network so that separation amplifiers are not required and thus an important advantage is obtained that, in practice, the nominal attenuation can be neglected.

Finally, it should be noted that the invention is not restricted to the particular embodiment described. For instance, it is possible to omit the decoupling resistors 27, provided they are replaced by a stopping resistor in each of the attenuation branches between the potentiometer and the second series resonant circuit.

What is claimed is:

1. An equalizing network for attenuation/frequency characteristic equalization comprising, a plurality of adjustable attenuation branches adapted to operate in mutually different frequency sub-bands, each of the attenuation branches being formed by the series arrangement of, in the following order, a first series resonant circuit, a potentiometer having a movable contact, and a second series resonant circuit, the first and second series resonant circuit each being tuned to the same intermediate frequency located in the relevant frequency sub-band the attenuation branches being arranged in a first and a second group such that attenuation branches pertaining to adjacent frequency sub-bands are in different groups with the attenuation branches in the same group arranged in parallel and connected to ground at one end, and the equalizing network further comprises an amplifier having an input connected through a matching impedance to an input terminal of the network and an output connected through a matching impedance to an output of the network and also to the amplifier input through a negative feedback circuit, said negative feedback circuit comprising the series arrangement of a first and a second pair of series-arranged resistors, means connecting the common junction of the resistors forming the first pair and the common junction of the resistors forming the second pair to the ends, remote from ground, of the first group and the second group of parallel-arranged attenuation branches, respectively, and means connecting the common junction of the first pair and the second pair of resistors to all the movable potentiometer contacts of both groups of attenuation branches.

2. An equalizing network as claimed in claim 1, characterized in that the second resonant circuits of the attenuation branches which are active in adjacent frequency sub-bands are mutually decoupled by means of decoupling resistors.

* * * * *